United States Patent
Yoo et al.

(10) Patent No.: US 9,397,350 B2
(45) Date of Patent: Jul. 19, 2016

(54) CARBON FIBER WEB INCLUDING POLYMER NANOFIBERS

(71) Applicant: Korea Institute of Energy Research, Daejeon (KR)

(72) Inventors: Yoonjong Yoo, Daejeon (KR); Hyunuk Kim, Daejeon (KR); Kwangsub Song, Daejeon (KR); Hongsoo Kim, Daejeon (KR); Young Ju Lee, Gyeongsangnam-do (KR); Sungjin Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 292 days.

(21) Appl. No.: 13/921,796

(22) Filed: Jun. 19, 2013

(65) Prior Publication Data

US 2014/0287337 A1 Sep. 25, 2014

(30) Foreign Application Priority Data

Mar. 21, 2013 (KR) ........................ 10-2013-0030337

(51) Int. Cl.
| | |
|---|---|
| *H01M 8/0243* | (2016.01) |
| *H01M 8/0234* | (2016.01) |
| *H01M 8/0239* | (2016.01) |
| *D04H 1/4242* | (2012.01) |
| *H01M 8/02* | (2016.01) |
| *D04H 1/542* | (2012.01) |
| *H01M 8/10* | (2016.01) |

(52) U.S. Cl.
CPC ........... *H01M 8/0243* (2013.01); *D04H 1/4242* (2013.01); *D04H 1/542* (2013.01); *H01M 8/0234* (2013.01); *H01M 8/0239* (2013.01); *H01M 2008/1095* (2013.01); *Y02E 60/50* (2013.01); *Y02P 70/56* (2015.11)

(58) Field of Classification Search
CPC ............ H01M 8/1002; H01M 8/0239; H01M 8/0243; H01M 8/0234; D04H 1/4242; D04H 1/543
See application file for complete search history.

(56) References Cited

U.S. PATENT DOCUMENTS

| | | | |
|---|---|---|---|
| 8,641,939 B2 * | 2/2014 | Chida et al. .................. | 264/29.1 |
| 2009/0142647 A1 * | 6/2009 | Sugi et al. ........................ | 429/40 |
| 2011/0294036 A1 * | 12/2011 | Sumioka et al. ............... | 429/482 |
| 2015/0086901 A1 * | 3/2015 | Tatsuno ........................ | 429/481 |

FOREIGN PATENT DOCUMENTS

| | | |
|---|---|---|
| JP | 2002-266217 A | 9/2002 |
| WO | WO2013147174 | * 10/2013 |

* cited by examiner

*Primary Examiner* — Ula C Ruddock
*Assistant Examiner* — Thomas Parsons
(74) *Attorney, Agent, or Firm* — Alston & Bird LLP

(57) ABSTRACT

Disclosed is a carbon fiber web including polymer nanofibers. Specifically, the carbon fiber web includes: a dispersed structure of carbon fibers; and polymer nanofibers distributed among and bonding the constituent carbon fibers of the dispersed structure. The carbon fiber web exhibits excellent characteristics in terms of flexural strength, gas permeability and electrical properties while possessing a tensile strength sufficient to undergo continuous processes for mass production. Also disclosed are a gas diffusion medium using the carbon fiber web, a gas diffusion layer including the gas diffusion medium, a membrane electrode assembly including the gas diffusion layer, and a fuel cell including the membrane electrode assembly. The use of the carbon fiber web ensures high performance of the membrane electrode assembly and the fuel cell.

12 Claims, 13 Drawing Sheets

CARBON FIBER WEB INCLUDING POLYMER NANOFIBERS

CROSS-REFERENCE TO RELATED APPLICATIONS

This application claims priority under 35 U.S.C. §119 to Korean Patent Application No. 10-2013-0030337 filed on Mar. 21, 2013 in the Korean Intellectual Property Office, the disclosure of which is incorporated herein by reference in its entirety.

BACKGROUND OF THE INVENTION

1. Field of the Invention

The present invention relates to a carbon fiber web which includes polymer nanofibers to achieve improved characteristics, thus being suitable for use in a gas diffusion layer for a fuel cell.

2. Description of the Related Art

A key component of a fuel cell is a membrane electrode assembly (MEA) which includes an electrode catalyst, a polymer electrolyte membrane, and a gas diffusion layer (GDL) integrated with each other. The performance of the fuel cell is determined by the performance of the elements constituting the membrane electrode assembly. Particularly, the gas diffusion layer is a very important material that simultaneously performs many functions, such as supporting the catalyst, conducting electricity generated from the electrode catalyst, uniformly dispersing and supplying reaction gases, and discharging water as a reaction product.

The gas diffusion layer is typically produced by impregnating an about 200 μm thick carbon fiber web with a resin and a conductive graphite powder, curing and carbonizing the impregnated carbon fiber web to prepare a gas diffusion medium (GDM), and forming a water repellent coating and a mesoporous layer (MPL) composed of a catalyst-supported carbon powder on the gas diffusion medium. That is, the carbon fiber-made gas diffusion medium and the catalyst-supported porous catalytic layer (CL) constitute the gas diffusion layer.

It is more advantageous for the gas diffusion layer to have 1) lower electrical resistance, 2) smaller thickness reduction at a stack assembly pressure (about 10 bar), 3) higher tensile and flexural strength, 4) higher gas permeability, and 5) lower water wettability. Accordingly, the characteristics of the gas diffusion layer are closely correlated with the characteristics of the gas diffusion medium, which is a material for the gas diffusion layer. That is, improved characteristics of the gas diffusion medium are directly connected to an improvement in the performance of the fuel cell. Therefore, improved characteristics and low production cost of the gas diffusion medium are very important considerations in improving the technology and price competitiveness of the fuel cell.

Water repellent carbon fiber webs with high gas permeability and electronic conductivity have been generally employed in gas diffusion layers for fuel cells. Such carbon fiber webs are produced by numerous methods. For example, a carbon fiber web is produced by a method based on a wet-laid process. According to this method, carbon fibers are dispersed in an aqueous solution, and then the dispersion is dehydrated, formed into a sheet, and dried using a wet paper making machine to produce a carbon fiber web. Particularly, since the carbon fiber web should undergo a series of continuous processes, such as resin impregnation, curing, carbonization and coating, for the production of a gas diffusion medium, it is required to have improved physical properties, such as high tensile strength and flexural strength. Improvements of raw materials for the carbon fiber web are also needed to decrease the thickness reduction rate of the carbon fiber web at a fuel cell stack assembly pressure and to reduce the electrical resistance of a gas diffusion layer. Conventional methods for producing carbon fiber webs require the addition of binders other than carbon fibers. However, a disadvantage of the carbon fiber webs is insufficient tensile strength due to weak bonding between the carbon fibers.

SUMMARY OF THE INVENTION

Therefore, the present invention has been made in an effort to solve the problems of the prior art, and it is an object of the present invention to provide a carbon fiber web that is produced by dispersing carbon fibers and adding polymer nanofibers, whose raw material is the same as that of the carbon fibers, to the dispersion, thereby achieving improved physical properties while ensuring excellent characteristics in terms of electrical resistance after carbonization.

According to an aspect of the present invention, there is provided a carbon fiber web including: a dispersed structure of carbon fibers; and polymer nanofibers distributed among and bonding the constituent carbon fibers of the dispersed structure.

In one embodiment of the present invention, the polymer nanofibers may be selected from the group consisting of PAN-based polymer nanofibers, pitch-based polymer nanofibers, rayon-based polymer nanofibers, and mixtures thereof.

In a further embodiment of the present invention, the carbon fibers may have a length of 1.0 mm to 10.0 mm and a diameter of 3 μm to 10 μm.

In another embodiment of the present invention, the polymer nanofibers may have a length of 5 μm to 500 μm and a diameter of 10 nm to 900 nm.

In another embodiment of the present invention, the polymer nanofibers may be present in an amount of 1% to 10% by weight, based on the total weight of the carbon fiber web.

In another embodiment of the present invention, the carbon fiber web may have a thickness of 40 μm to 400 μm.

According to another aspect of the present invention, there is provided a method for producing a carbon fiber web, including:

mixing and dispersing carbon fibers and polymer nanofibers in water to prepare a dispersion; and dehydrating the dispersion, forming the dehydrated product into a sheet, and drying the sheet using a wet forming machine.

According to another aspect of the present invention, there is provided a gas diffusion medium including the carbon fiber web.

According to another aspect of the present invention, there is provided a method for producing a gas diffusion medium, including:

impregnating the carbon fiber web with a resin and a conductive graphite powder, and curing the impregnated carbon fiber web; and carbonizing the resin component of the cured product.

According to another aspect of the present invention, there is provided a gas diffusion layer for a fuel cell, including:

the gas diffusion medium; and a porous catalytic layer.

According to another aspect of the present invention, there is provided a membrane electrode assembly including the gas diffusion layer.

According to yet another aspect of the present invention, there is provided a fuel cell including the membrane electrode assembly.

The carbon fiber web of the present invention has a low thickness reduction rate under pressure and exhibits excellent characteristics in terms of flexural strength, gas permeability and electrical properties while possessing a tensile strength sufficient to undergo continuous processes for mass production. Due to these advantages, the gas diffusion medium using the carbon fiber web, the gas diffusion layer including the gas diffusion medium, the membrane electrode assembly including the gas diffusion layer, and the fuel cell including the membrane electrode assembly have excellent performance characteristics.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
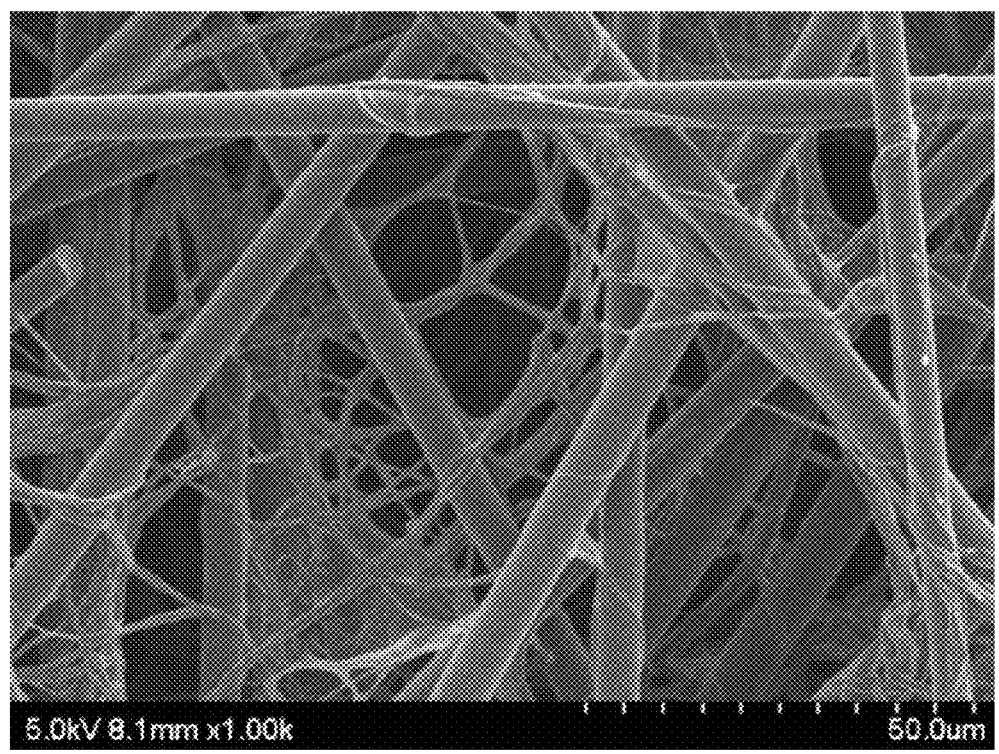
FIGS. 1 and 2 are images showing the surfaces of carbon fiber webs produced in Example 1 and Comparative Example 1.

The present invention will now be described in more detail with reference to the accompanying drawings and the following examples.

The present invention is intended to produce a carbon fiber web that has a low thickness reduction rate under pressure and exhibits excellent electrical properties while possessing physical properties (e.g., tensile strength) sufficient to undergo continuous processes for mass production. The present invention is also intended to provide a gas diffusion medium using the carbon fiber web, a gas diffusion layer including the gas diffusion medium, a membrane electrode assembly for a fuel cell including the gas diffusion layer, and a fuel cell including the membrane electrode assembly.

The present invention provides a carbon fiber web including a dispersed structure of carbon fibers, and polymer nanofibers distributed among and bonding the constituent carbon fibers of the dispersed structure.

That is, the polymer nanofibers are used to bond the constituent carbon fibers of the dispersed structure in the carbon fiber web of the present invention, unlike a conventional carbon fiber web in which an organic binder is used to bond a dispersed structure of carbon fibers. The polymer nanofibers distributed among the carbon fibers increase the bonding strength between the carbon fibers and enhances the compressive strength of the carbon fiber web. The increased bonding strength contributes to an improvement in the physical properties of the carbon fiber web, and the enhanced compressive strength minimizes a reduction in the thickness of a gas diffusion layer occurring during subsequent assembly of a fuel cell stack. When the carbon fiber web is cured and carbonized to produce a gas diffusion medium, the polymer nanofibers distributed in the carbon fiber web undergo carbonization and is finally present in the gas diffusion medium and even a gas diffusion layer including the gas diffusion medium. The presence of the polymer nanofibers is effective in decreasing the electrical resistance values of the gas diffusion medium and the gas diffusion layer.

In the present invention, the polymer nanofibers may be prepared using the same raw material as the carbon fibers. For example, the polymer nanofibers may be selected from the group consisting of, but not limited to, PAN-based polymer nanofibers, pitch-based polymer nanofibers, rayon-based polymer nanofibers, and mixtures thereof.

The carbon fibers as elements constituting the carbon fiber web of the present invention may have a length of 1.0 mm to 10.0 mm and a diameter of 3 μm to 10 μm. If the carbon fibers are shorter than the lower limit of the range defined above, the carbon fibers may be disconnected, resulting in high electrical resistance, and the carbon fiber web is densified, resulting in low gas permeability. Meanwhile, if the carbon fibers are longer than the upper limit of the range defined above, the dispersibility of the carbon fibers deteriorates considerably, and as a result, it is difficult to make the carbon fiber web uniform. If the carbon fibers have a diameter smaller than the lower limit of the range defined above, the carbon fibers are rapidly crushed into single fibers when a physical impact is applied thereto during a dispersion step for the production of the carbon fiber web, eventually making the carbon fiber web dense. Meanwhile, if the carbon fibers have a diameter larger than the upper limit of the range defined above, the carbon fiber web becomes excessively thick, which is undesirable.

Preferably, the polymer nanofibers have a length of 5 μm to 500 μm and a diameter of 10 nm to 900 nm. If the polymer nanofibers are shorter than 5 μm, the carbon fibers distributed in the carbon fiber web are not sufficiently bonded to each other. Meanwhile, if the polymer nanofibers are longer than 500 μm, the dispersibility of the polymer nanofibers is undesirably deteriorated. If the diameter of the polymer nanofibers is smaller than 10 nm, the ability of the polymer nanofibers to bond the carbon fibers is undesirably deteriorated. Meanwhile, if the diameter of the polymer nanofibers is larger than 900 nm, the carbon fibers tend to become rectilinear, and as a result, their entanglement is very limited.

The polymer nanofibers may be present in an amount of 1% to 10% by weight, based on the total weight of the carbon fiber web. If the polymer nanofibers are present in an amount of less than 1% by weight, the effect of adding the polymer nanofibers is negligible, i.e. improved bonding strength between the carbon fibers cannot be achieved. Meanwhile, if the polymer nanofibers are present in an amount exceeding 10% by weight, dispersibility of the polymer nanofibers and the carbon fiber is greatly deteriorated and the carbon fiber web becomes dense during production, making it difficult to remove water therefrom.

The distribution of the polymer nanofibers among the carbon fibers enables bonding between the carbon fibers to improve the mechanical strength and compressive strength of the carbon fiber web. This improved strength minimizes a reduction in the thickness of a gas diffusion layer occurring during subsequent assembly of a fuel cell stack. Specifically, the carbon fiber web of the present invention may have a thickness of about 40 μm to about 400 μm.

The present invention also provides a method for producing the carbon fiber web. The method of the present invention includes: mixing and dispersing carbon fibers and polymer nanofibers in water to prepare a dispersion; and dehydrating the dispersion, forming the dehydrated product into a sheet, and drying the sheet using a wet forming machine. That is, the method of the present invention is based on a wet-laid process. First, carbon fibers and polymer nanofibers as constituent materials of the carbon fiber structure are added to a predetermined amount of water and stirred to prepare a slurry-like dispersion. The dispersion was fed into and dehydrated in a dehydrator. The dehydrator may be a general batch- or continuous-type paper making machine equipped with a wire mesh. The dehydrated product is passed through a drying roll having a predetermined temperature to produce the carbon fiber web of the present invention.

The present invention also provides a gas diffusion medium (GDM) for a fuel cell including the carbon fiber web. The gas diffusion medium of the present invention may be produced by impregnating the carbon fiber web with a resin and a conductive graphite powder, curing the impregnated carbon fiber web, and carbonizing the resin component of the cured product.

The gas diffusion medium can be used to produce a gas diffusion layer for a fuel cell. The gas diffusion layer may be produced by forming a porous catalytic layer composed of a mesoporous carbon powder and a catalyst on the gas diffusion medium, followed by water repellent coating. The gas diffusion layer is joined to a polymer membrane to construct a membrane electrode assembly (MEA) of a fuel cell.

The present invention will be explained in more detail with reference to the following examples. However, these examples are provided to assist in a further understanding of the invention and are not intended to limit the scope of the invention.

Production of Carbon Fiber Webs

Example 1

Production of Carbon Fiber Web of the Present Invention 12 g of carboxymethyl cellulose (CMC) (FH1000, Korea Chemical Co., Ltd.) as a thickener was added to 2 liters of tap water in a beaker. The thickener was dissolved with stirring at 1,000 rpm for 30 min. The solution had a kinematic viscosity of 135 cSt. To the solution were sequentially added 2 g of 4.5 mm chopped carbon fibers (T-700, Toray), 0.3 g of 2.0 mm chopped polyvinyl alcohol as a binder, and 0.09 g of polyacrylonitrile (PAN)-based nanofibers (home-made). The mixture was stirred at 1,500 rpm for at least 2 h to prepare a slurry. Then, the slurry was poured into a wet paper forming machine (Sheet machine DM-831, Daiill Machine Industry) equipped with a triple-woven wire mesh (air permeability=345) at the bottom thereof, allowed to stand for 1 min, and dehydrated to obtain a carbon fiber web having a predetermined shape. The web was secondarily dehydrated using an absorbent paper, released from the absorbent paper, and passed through a drying roll having a surface temperature of 90° C. The finished carbon fiber web was found to have a thickness of 250 μm and a basis weight of 38.1 g/m$^2$.

Comparative Example 1

Production of Carbon Fiber Web of the Prior Art

A carbon fiber web was produced in the same manner as in Example 1, except that the PAN-based nanofibers were not added. The carbon fiber web was found to have a thickness of 223 μm and a basis weight of 32.4 g/m$^2$.

The compositions of the components used in Example 1 and Comparative Example 1 are shown in Table 1.

TABLE 1

|  | Water (g) | Carbon fibers (g) | Thickener (g) | Binder (g) | PAN-based nanofibers (g) |
| --- | --- | --- | --- | --- | --- |
| Example 1 | 2,000 | 2 | 12 | 0.3 | 0.09 |
| Comparative Example 1 | 2,000 | 2 | 12 | 0.3 | — |

Figure 2:
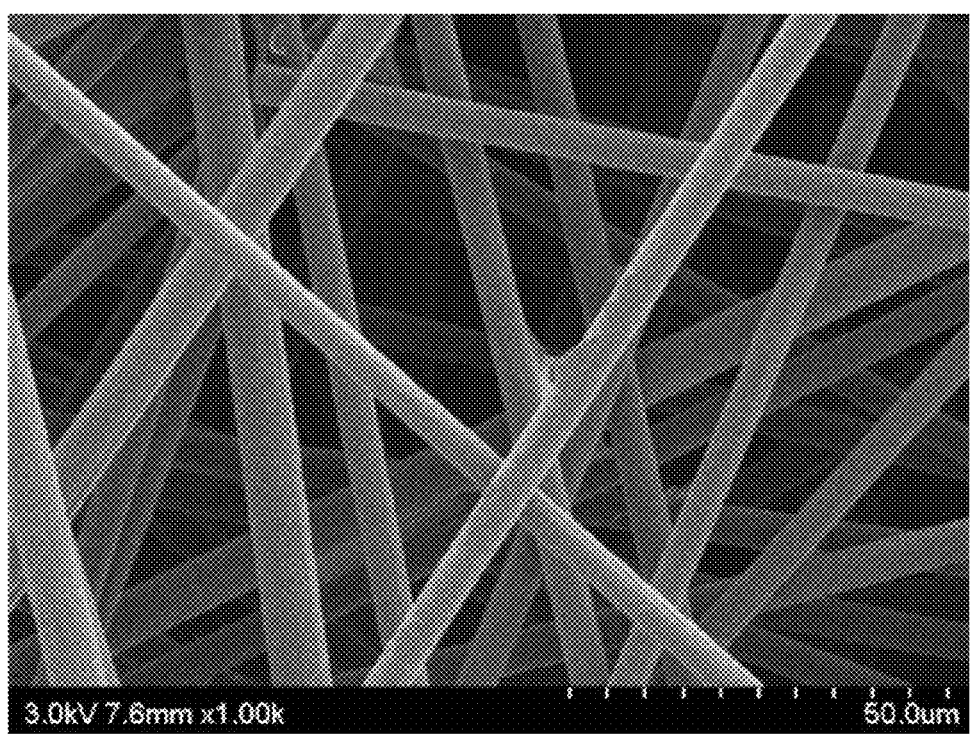

Surface images of the carbon fiber webs produced in Example 1 and Comparative Example 1 are shown in FIGS. 1 and 2, respectively. As can be seen from FIGS. 1 and 2, the PAN-based nanofibers effectively act as binders to strongly bond the carbon fibers in the carbon fiber web.

Example 2

Production of Gas Diffusion Medium of the Present Invention

The carbon fiber web produced in Example 1 was impregnated with a solution of a conductive graphite powder (MGF-4, Samjung C&G), a resol-type phenolic resin (KRD-HM2, Kolon), and methanol in a weight ratio of 1:1.4:8.6 for 5 min, and cured at 80° C. and 150° C. Subsequently, the cured product was carbonized by heating to 1,200° C. at a rate of 5° C./min under a nitrogen atmosphere, and standing for 2 h. The amount of the carbon powder and the phenolic resin impregnated was 47.4 wt %, based on the total weight of the carbonized product.

Comparative Example 2

Production of Gas Diffusion Medium of the Prior Art

A gas diffusion medium was produced in the same manner as in Example 2, except that the carbon fiber web produced in Comparative Example 1 was used. The amount of the carbon powder and the phenolic resin impregnated was 30.6 wt %, based on the total weight of the carbonized product.

Figure 3:
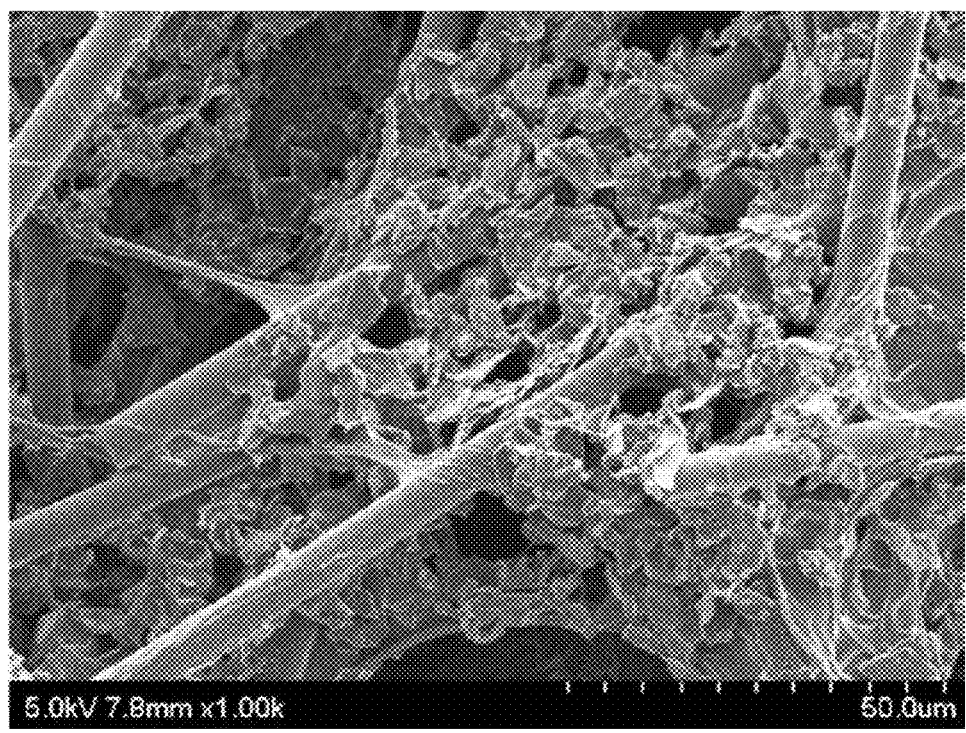
FIGS. 3 and 4 are images showing the surfaces of gas diffusion media produced in Example 2 and Comparative Example 2.
Figure 4:
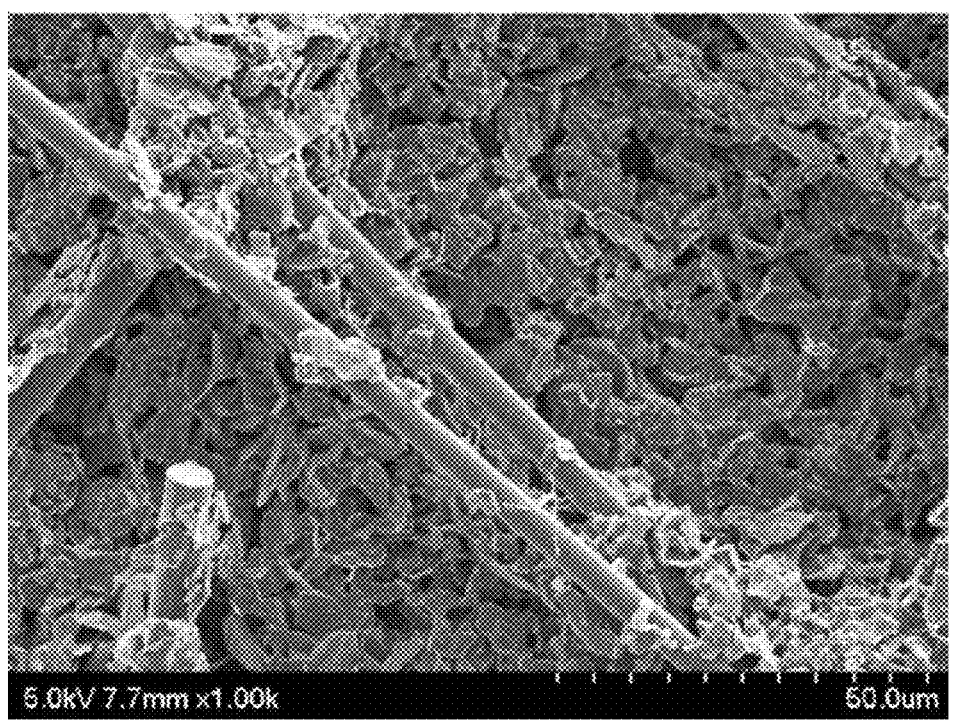

Surface images of the gas diffusion media produced in Example 2 and Comparative Example 2 are shown in FIGS. 3 and 4, respectively. As can be seen from FIGS. 3 and 4, the PAN-based nanofibers still remained in the carbon fiber web even after high-temperature carbonization, and good binding between the carbon fibers and between the carbon fibers and the graphite powder was maintained.

Experimental Example 1

Measurement of Tensile Strengths

Figure 5:
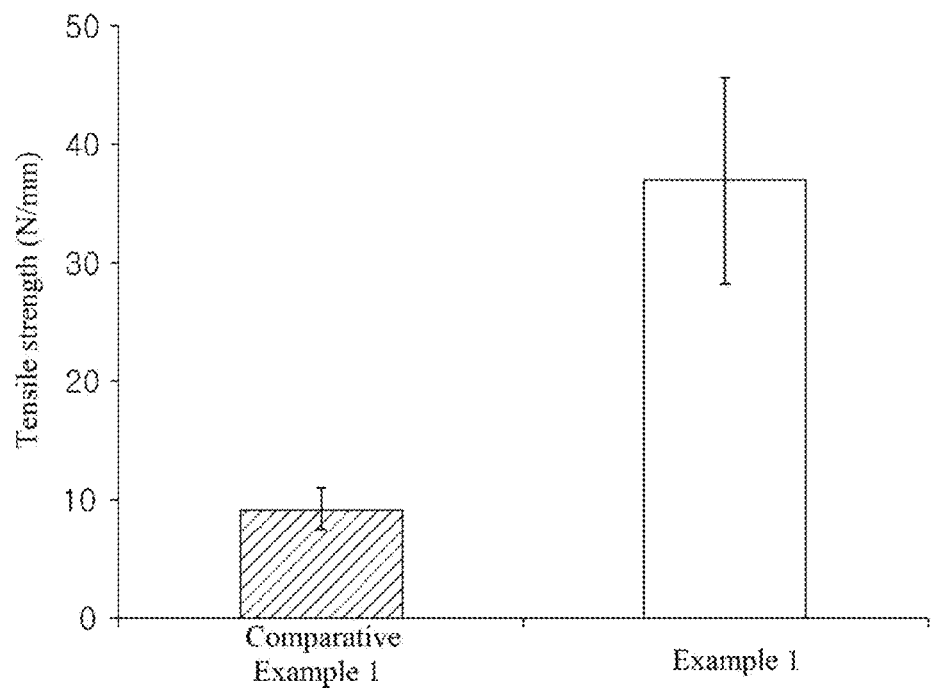
FIG. 5 is a graph comparing the tensile strengths of carbon fiber webs produced in Example 1 and Comparative Example 1.

The tensile strengths of the carbon fiber web of Example 1, which was produced with the addition of the PAN-based nanofibers, and the carbon fiber web of Comparative Example 1, which was produced without the addition of the PAN-based nanofibers, were measured and compared. The results are shown in FIG. 5. The tensile strength measurements were done using a universal testing machine (H5KT, Tinius Olsen) according to T494, a test method for tensile strength of paper. The measurements were repeated 10 times in the same manner. The highest and lowest values were discarded and the other values were averaged. The graph of FIG. 5 indicates that the carbon fiber webs of Example 1 and Comparative Example 1 had average tensile strengths of 37.137 N/mm and 9.263 N/mm, respectively. That is, the tensile strength of the inventive carbon fiber web was about 400% higher than that of the prior art carbon fiber web.

Experimental Example 2

Measurement of Flexural Strengths

Figure 6:
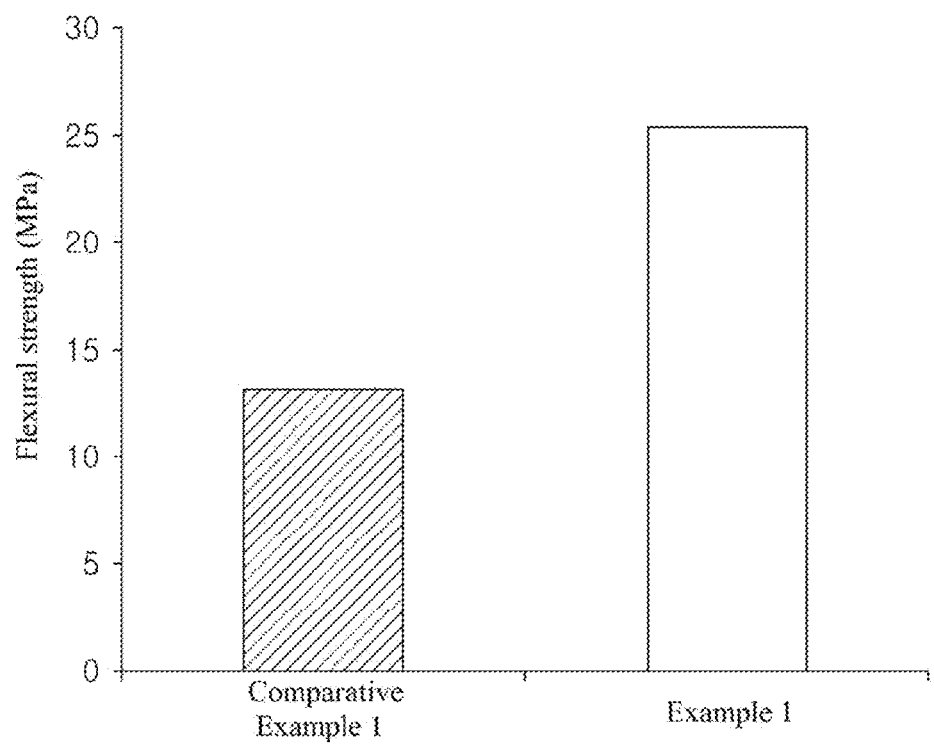
FIG. 6 is a graph comparing the flexural strengths of carbon fiber webs produced in Example 1 and Comparative Example 1.
Figure 7:
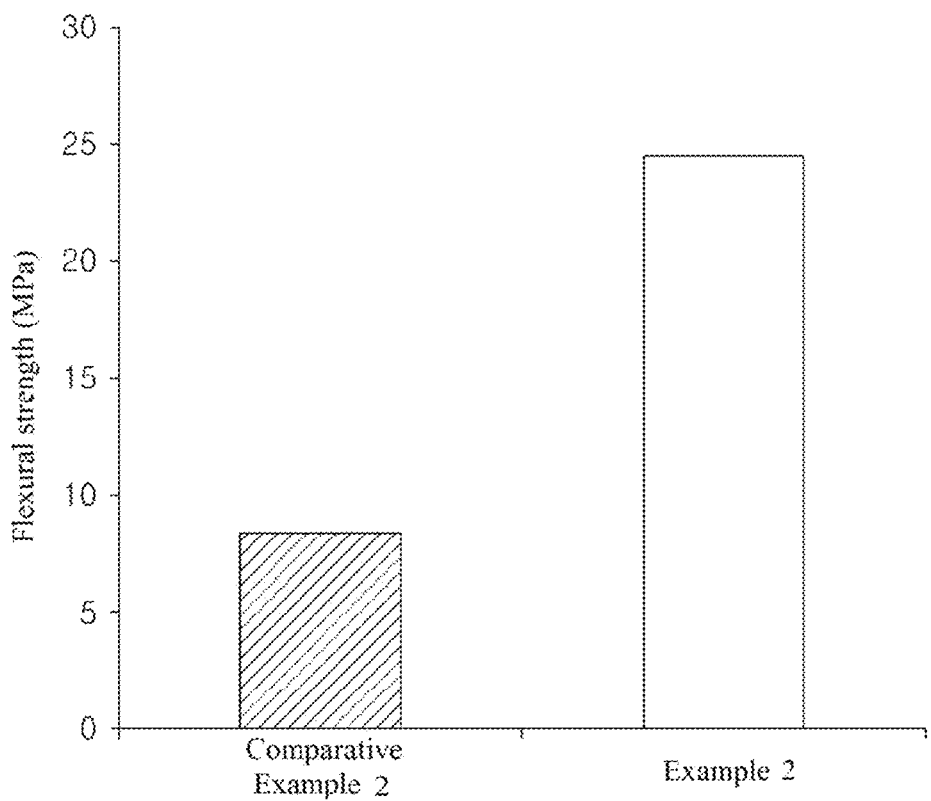
FIG. 7 is a graph comparing the flexural strengths of gas diffusion media produced in Example 2 and Comparative Example 2.

The flexural strengths of the carbon fiber web of Example 1, which was produced with the addition of the PAN-based nanofibers, and the carbon fiber web of Comparative Example 1, which was produced without the addition of the PAN-based nanofibers, were measured and compared. The results are shown in FIG. 6. The flexural strengths of the gas diffusion media of Example 2 and Comparative Example 2 were measured and are shown in FIG. 7. The flexural strength measurements were done using a universal testing machine (H5KT, Tinius Olsen) according to ASTM D 790. The measurements were repeated 5 times and averaged. The graph of FIG. 6 indicates that the carbon fiber webs of Example 1 and Comparative Example 1 had average flexural strengths of 25.45 MPa and 13.18 MPa, respectively. That is, the flexural strength of the inventive carbon fiber web was about 193% higher than that of the prior art carbon fiber web. FIG. 7 indicates that the flexural strengths of the gas diffusion media of Example 2 and Comparative Example 2 were 24.58 MPa and 8.43 MPa, respectively. That is, the flexural strength of the inventive gas diffusion medium was about 290% higher than that of the prior art gas diffusion medium. As a consequence, the results of FIGS. 6 and 7 demonstrate the fact that the inventive carbon fiber web and the inventive gas diffusion medium using the carbon fiber web exhibit far superior flexural strength characteristics to the prior art carbon fiber web and gas diffusion medium.

Experimental Example 3

Measurement of Thickness Reduction Rates

A gas diffusion layer undergoes a thickness reduction under a fuel cell stack assembly pressure, resulting in the deformation of a membrane electrode assembly. This deformation may be a cause of damage to a water repellent coating layer, non-uniform gas diffusion, and increased electrical resistance. Particularly, when a plurality of membrane electrode assemblies are laminated and assembled to fabricate a high-capacity fuel cell on a large area, the above problems can be overcome by a smaller thickness reduction of gas diffusion layers. Therefore, a lower thickness reduction rate of a carbon fiber web as a starting material for a gas diffusion layer enables the fabrication of a better fuel cell.

Figure 8:
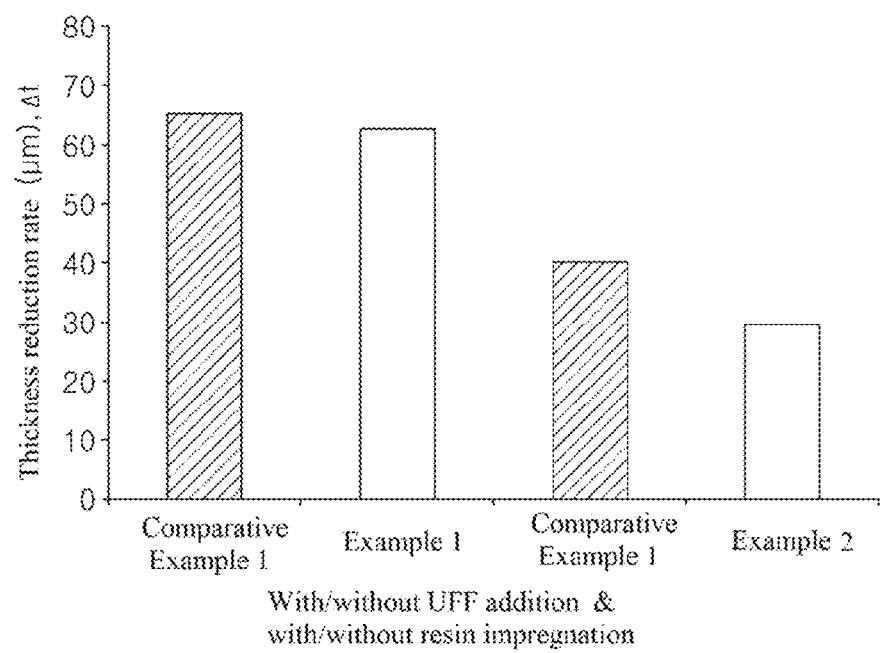
FIG. 8 is a graph comparing changes in the thickness of carbon fiber webs produced in Example 1 and Comparative Example 1 and gas diffusion media produced in Example 2 and Comparative Example 2 at a stack assembly pressure (10 bar)
Figure 9:
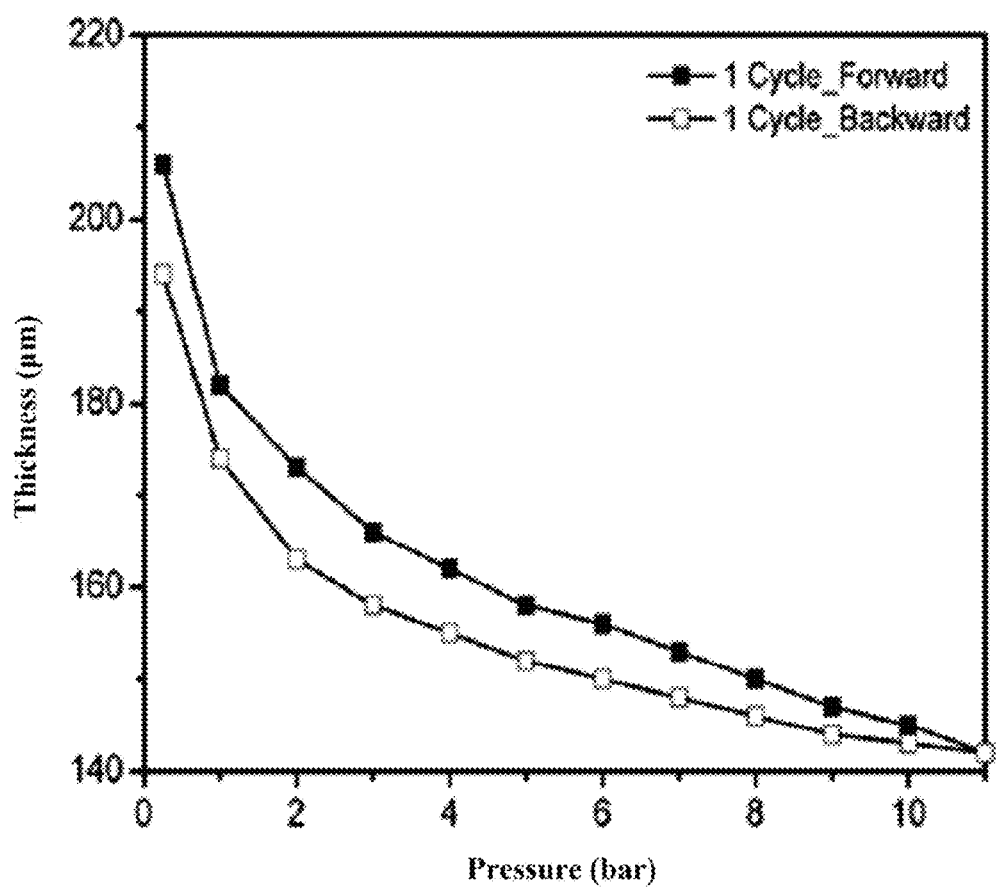
FIGS. 9 and 10 are graphs comparing changes in the thickness of gas diffusion media produced in Example 2 and Comparative Example 2 at a stack assembly pressure, respectively.
Figure 10:
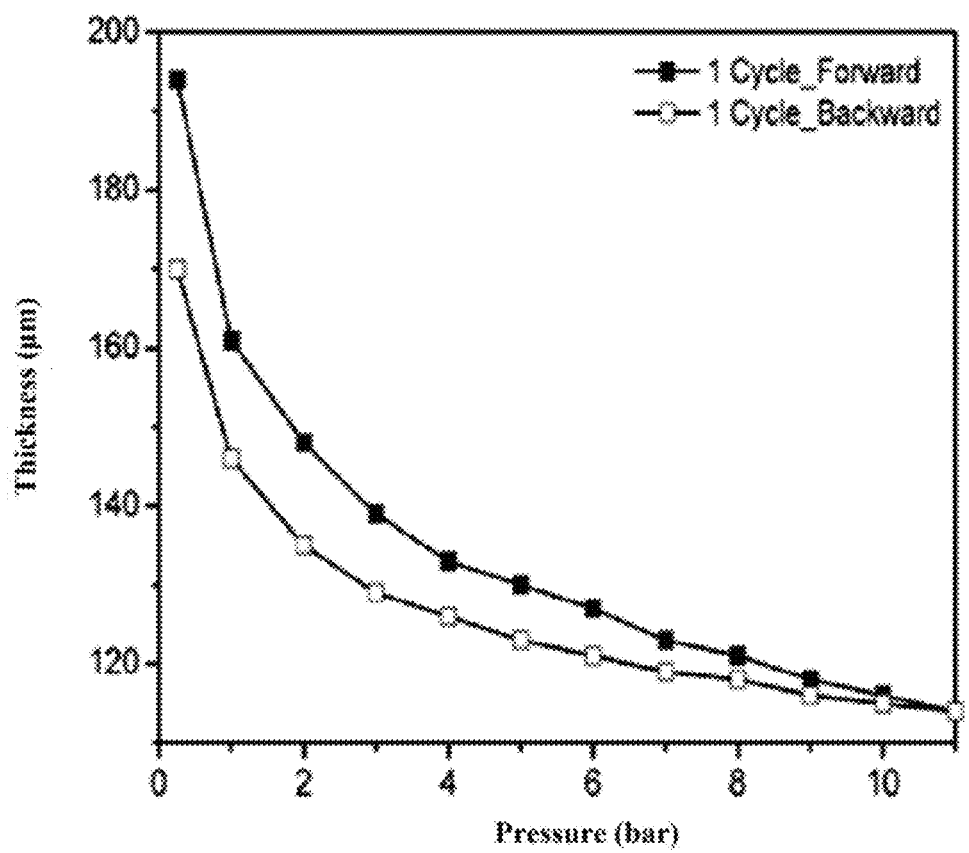

FIG. 8 is a graph showing changes in the thickness of the carbon fiber webs produced in Example 1 and Comparative Example 1 and the gas diffusion media produced in Example 2 and Comparative Example 2 at a stack assembly pressure (10 bar). As can be seen from FIG. 8, the carbon fiber web of Example 1 had a thickness reduction rate of 62.8%, the carbon fiber web of Comparative Example 1 had a thickness reduction rate of 65.5%, the gas diffusion medium of Example 2 had a thickness reduction rate of 29.6%, and the gas diffusion medium of Comparative Example 2 had a thickness reduction rate of 40.2%. Particularly, the thickness variations of the gas diffusion medium (GDM) of Example 2, which was produced by impregnating the carbon fiber web with the conductive graphite powder and the phenolic resin, curing the impregnated carbon fiber web, and carbonizing the cured carbon fiber web, and the gas diffusion medium (GDM) of Comparative Example 2 can be considered very important data that affect the performance of gas diffusion layers (GDLs) and membrane electrode assemblies (MEAs). FIGS. 9 and 10 are graphs showing changes in the thickness of the gas diffusion media produced in Example 2 and Comparative Example 2 at a stack assembly pressure, respectively. Referring to FIGS. 9 and 10, the thickness reduction of the inventive gas diffusion medium was much smaller than that of the prior art gas diffusion medium at the same stack assembly pressure. Therefore, it can be concluded that the addition of the polymer nanofibers is very effective in decreasing the thickness reduction of the gas diffusion layer at a stack assembly pressure.

Experimental Example 4

Measurement of Electrical Resistance

Figure 11:
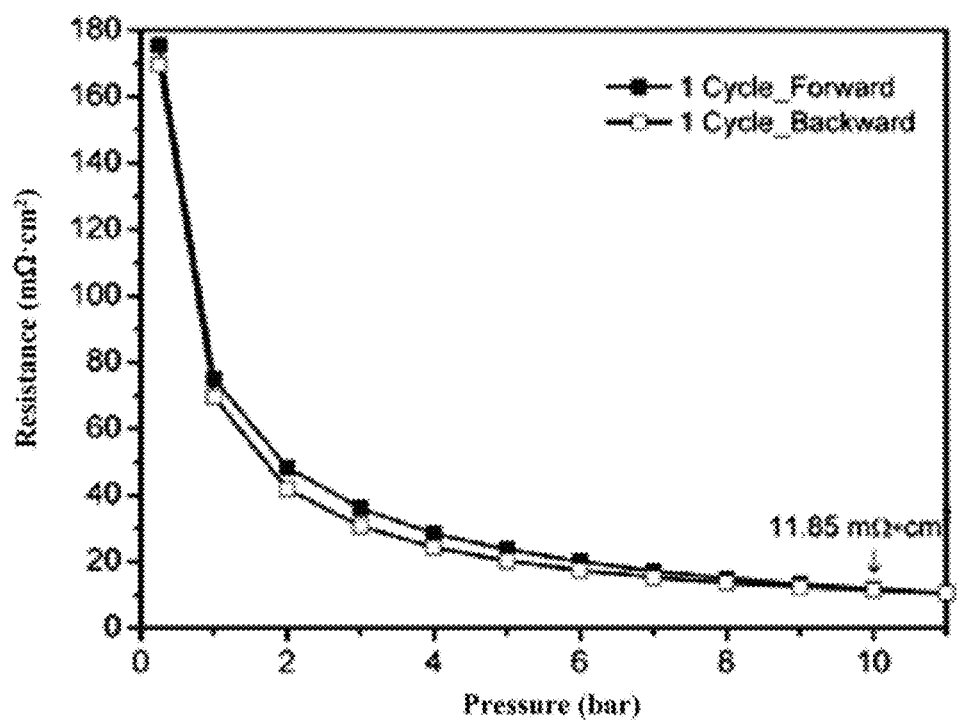
FIGS. 11 and 12 are graphs showing changes in the electrical resistance of carbon fiber webs produced in Example 1 and Comparative Example 1 at a stack assembly pressure (10 bar) after carbonization under a nitrogen atmosphere at 1,200° C., respectively.
Figure 12:
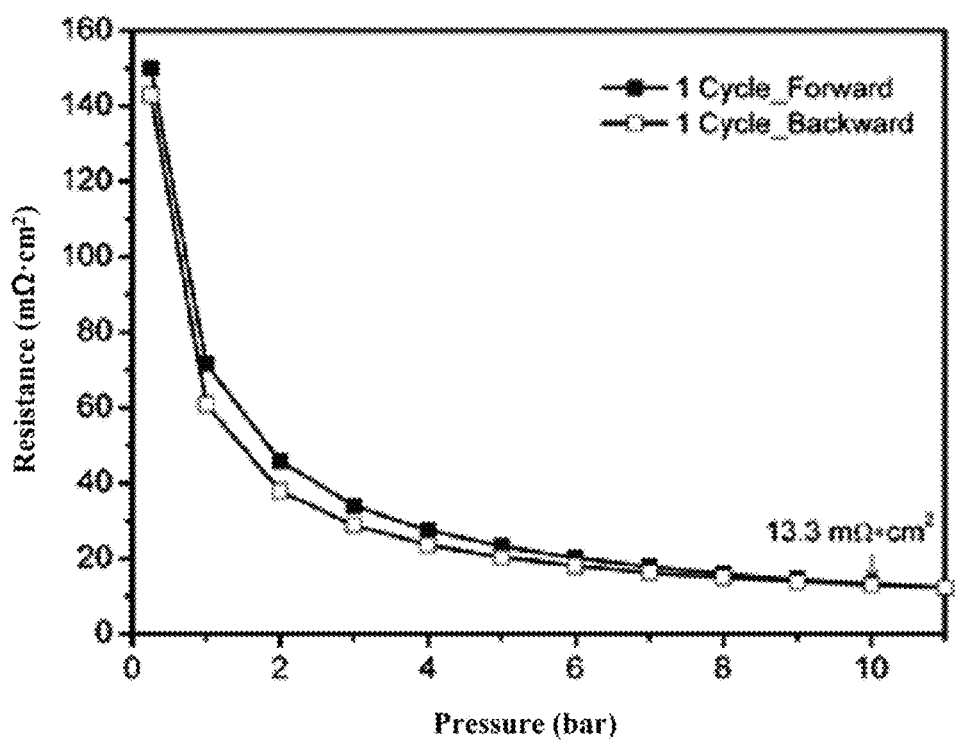
Figure 13:
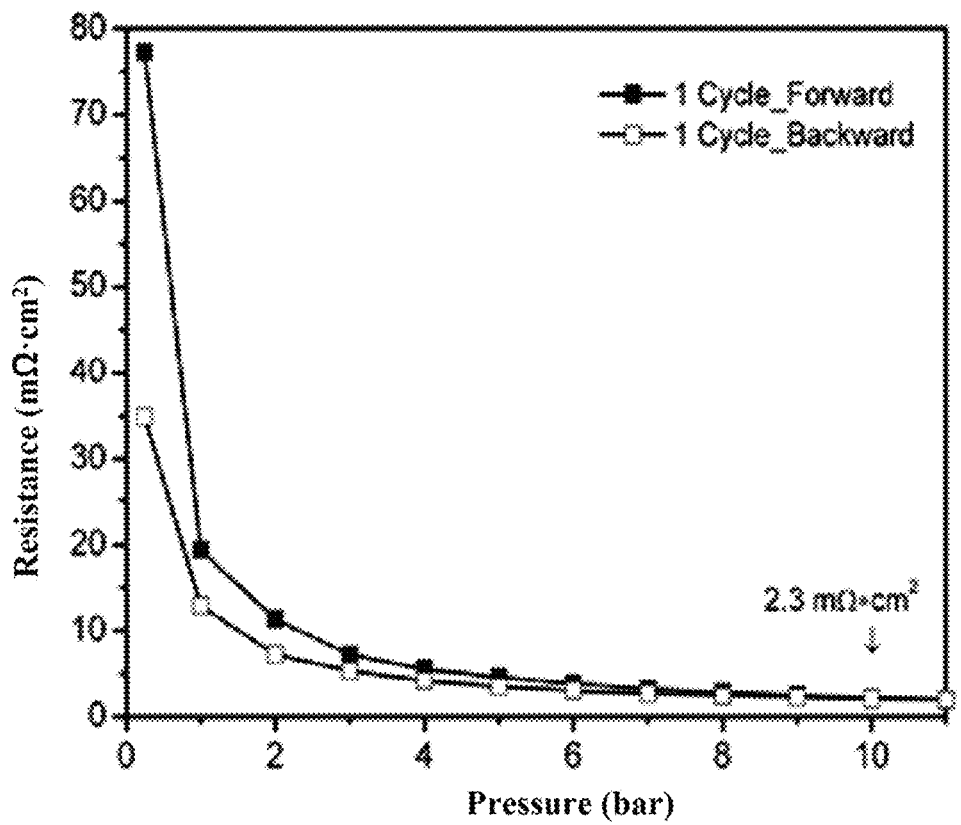
FIGS. 13 and 14 are graphs showing changes in the electrical resistance of gas diffusion media produced in Example 2 and Comparative Example 2 at a stack assembly pressure (10 bar) after carbonization under a nitrogen atmosphere at 1,200° C., respectively.
Figure 14:
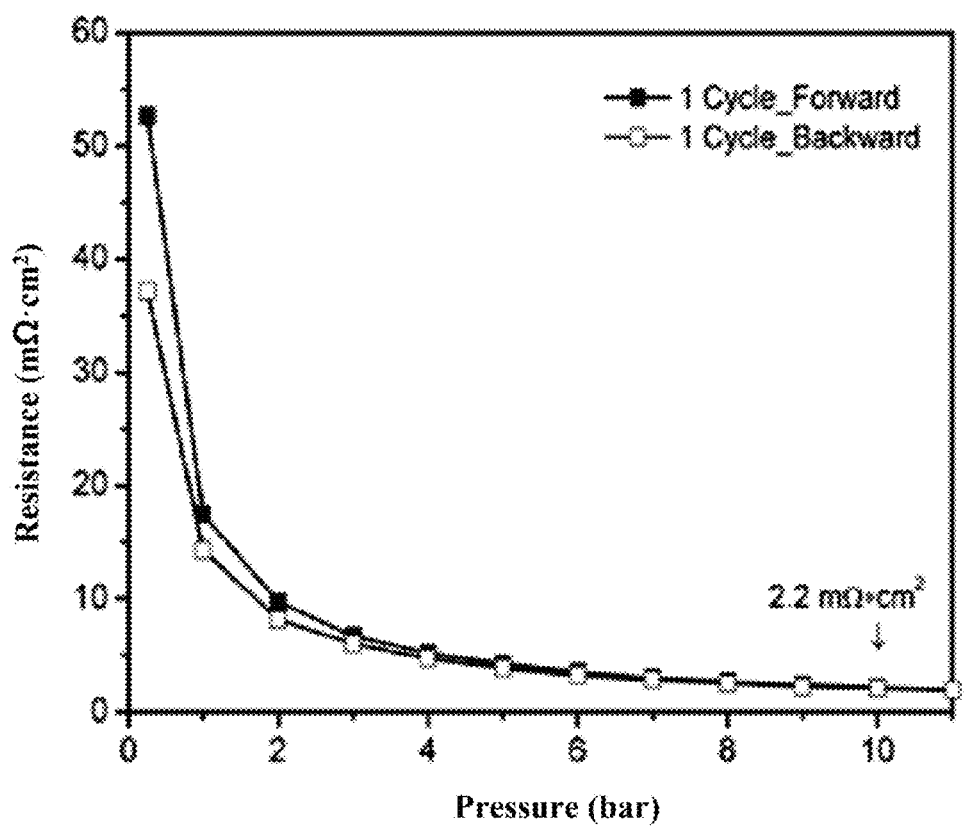

After the carbon fiber webs of Example 1 and Comparative Example 1 were carbonized under a nitrogen atmosphere at 1,200° C., changes in the electrical resistance of the carbon fiber webs at a stack assembly pressure (10 bar) were measured. The results are shown in FIGS. 11 and 12. Further, changes in the electrical resistance of the gas diffusion media of Example 2 and Comparative Example 2 at a stack assembly pressure (10 bar) were measured, and the results are shown in FIGS. 13 and 14.

Figure 15:
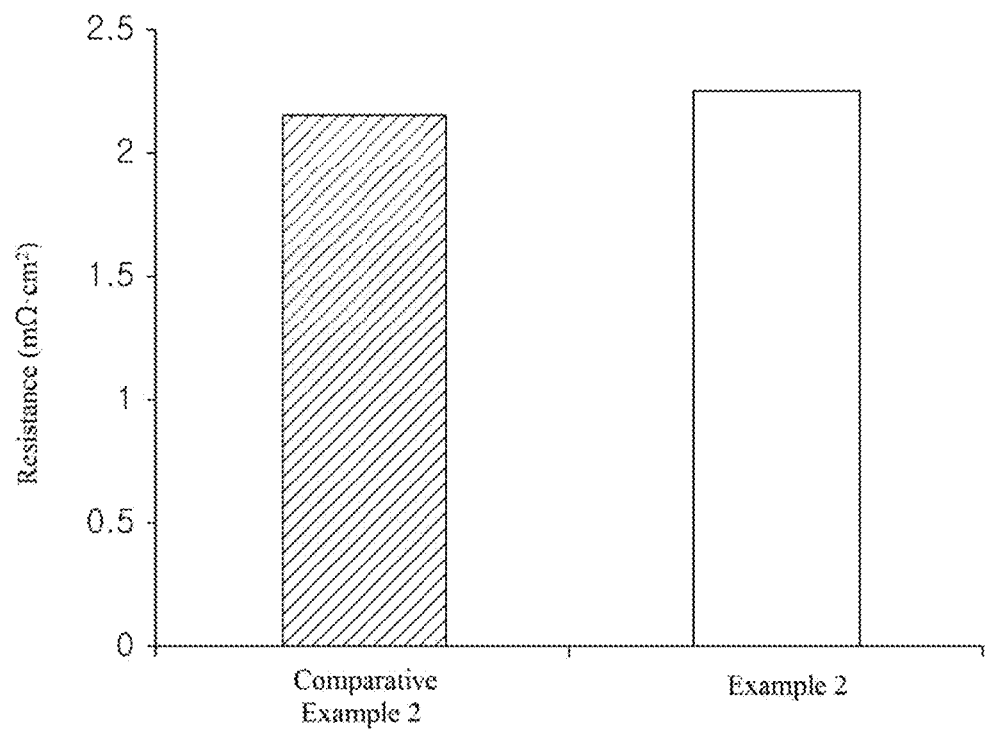
FIG. 15 is a graph comparing the electrical resistance values of gas diffusion media produced in Example 2 and Comparative Example 2.

FIGS. 11 and 12 indicate that the carbon fiber webs of Example 1 and Comparative Example 1 had electrical resistance values of 11.85 mΩ·cm$^2$ and 13.3 mΩ·cm$^2$, respectively. The electrical resistance of the carbon fiber web of Example 1, which was produced with the addition of the polymer nanofibers, after carbonization was much smaller than that of the carbon fiber web of Comparative Example 1. FIGS. 13 and 14 indicate that the gas diffusion media of Example 2 and Comparative Example 2 had electrical resistance values of 2.25 mΩ·cm$^2$ and 2.16 mΩ·cm$^2$, respectively. FIG. 15 is a graph comparing the electrical resistance values of the gas diffusion media of Example 2 and Comparative Example 2. The values are almost the same within the error range. The lower electrical resistance values of the gas diffusion media of Example 2 and Comparative Example 2 than the carbon fiber webs of Example 1 and Comparative Example 1 after carbonization are believed to be because the gas diffusion media were produced by carbonization of the carbon fiber webs impregnated with the conductive graphite powder.

Experimental Example 5

Gas Permeability

Figure 16:
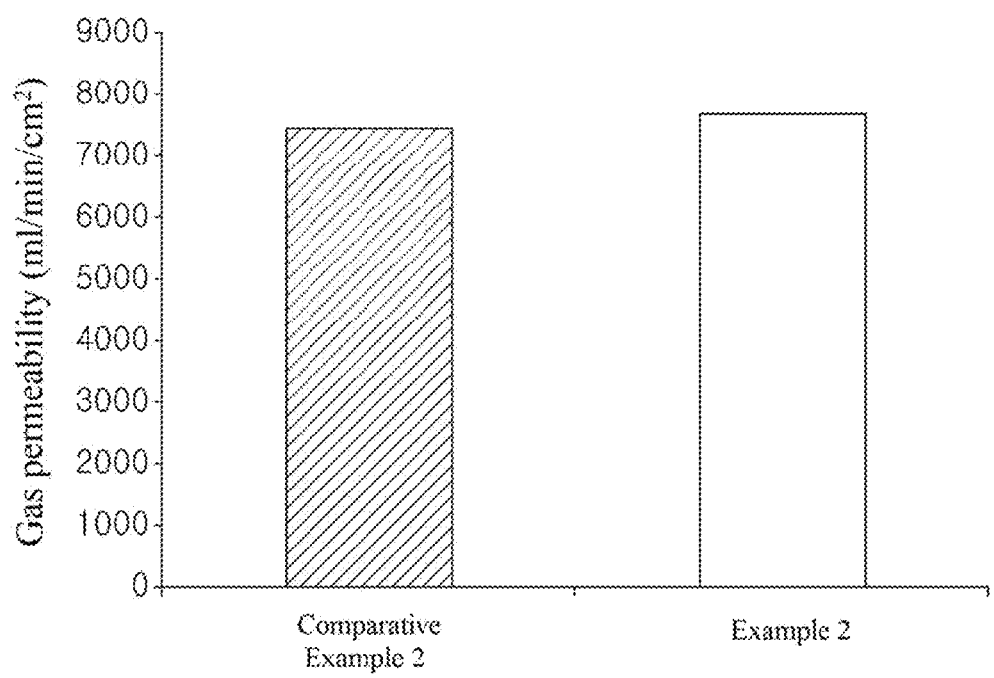
FIG. 16 is a graph comparing the gas permeabilities of gas diffusion media produced in Example 2 and Comparative Example 2.

The gas permeabilities of the gas diffusion media of Example 2 and Comparative Example 2 were measured using an air permeability tester (A-10, Borgwaldt kc, head 1×1 cm$^2$, 1 kpa). The results are shown in FIG. 16. As can be seen from FIG. 16, the gas diffusion media of Example 2 and Comparative Example 2 had almost the same gas permeabilities. In conclusion, no substantial reduction in the gas permeability of the inventive gas diffusion medium occurred despite the addition of the polymer nanofibers, demonstrating that the inventive gas diffusion medium can be employed in a gas diffusion layer of a fuel cell due to its sufficient gas permeability.

What is claimed is:

1. A carbon fiber web comprising: a dispersed structure of carbon fibers; and polymer nanofibers distributed among and bonding the constituent carbon fibers of the dispersed structure, wherein the polymer nanofibers have a length of 5 µm to 500 µm.

2. The carbon fiber web according to claim 1, wherein the polymer nanofibers are selected from the group consisting of PAN-based polymer nanofibers, pitch-based polymer nanofibers, rayon-based polymer nanofibers, and mixtures thereof.

3. The carbon fiber web according to claim 1, wherein the carbon fibers have a length of 1.0 mm to 10.0 mm and a diameter of 3 µm to 10 µm.

4. The carbon fiber web according to claim 1, wherein the polymer nanofibers have a diameter of 10 nm to 900 nm.

5. The carbon fiber web according to claim 1, wherein the polymer nanofibers are present in an amount of 1% to 10% by weight, based on the total weight of the carbon fiber web.

6. The carbon fiber web according to claim 1, wherein the carbon fiber web has a thickness of 40 µm to 400 µm.

7. A gas diffusion medium comprising the carbon fiber web according to claim 1.

8. A method for producing a gas diffusion medium, comprising:
   impregnating the carbon fiber web according to claim 1 with a resin and a conductive graphite powder, and curing the impregnated carbon fiber web; and
   carbonizing the resin component of the cured product.

9. A gas diffusion layer for a fuel cell, comprising:
   the gas diffusion medium according to claim 7; and
   a porous catalytic layer.

10. A membrane electrode assembly comprising the gas diffusion layer according to claim 9.

11. A fuel cell comprising the membrane electrode assembly according to claim 10.

12. A method for producing a carbon fiber web, comprising:
   mixing and dispersing carbon fibers and polymer nanofibers in water to prepare a dispersion; and
   dehydrating the dispersion, forming the dehydrated product into a sheet, and drying the sheet using a wet forming machine, wherein the polymer nanofibers in the dried sheet have a length of 5 µm to 500 µm.

* * * * *